Dec. 20, 1932.     M. V. REED     1,891,578
FOUR-WHEEL STEERING GEAR FOR AUTOMOBILES
Filed June 21, 1930
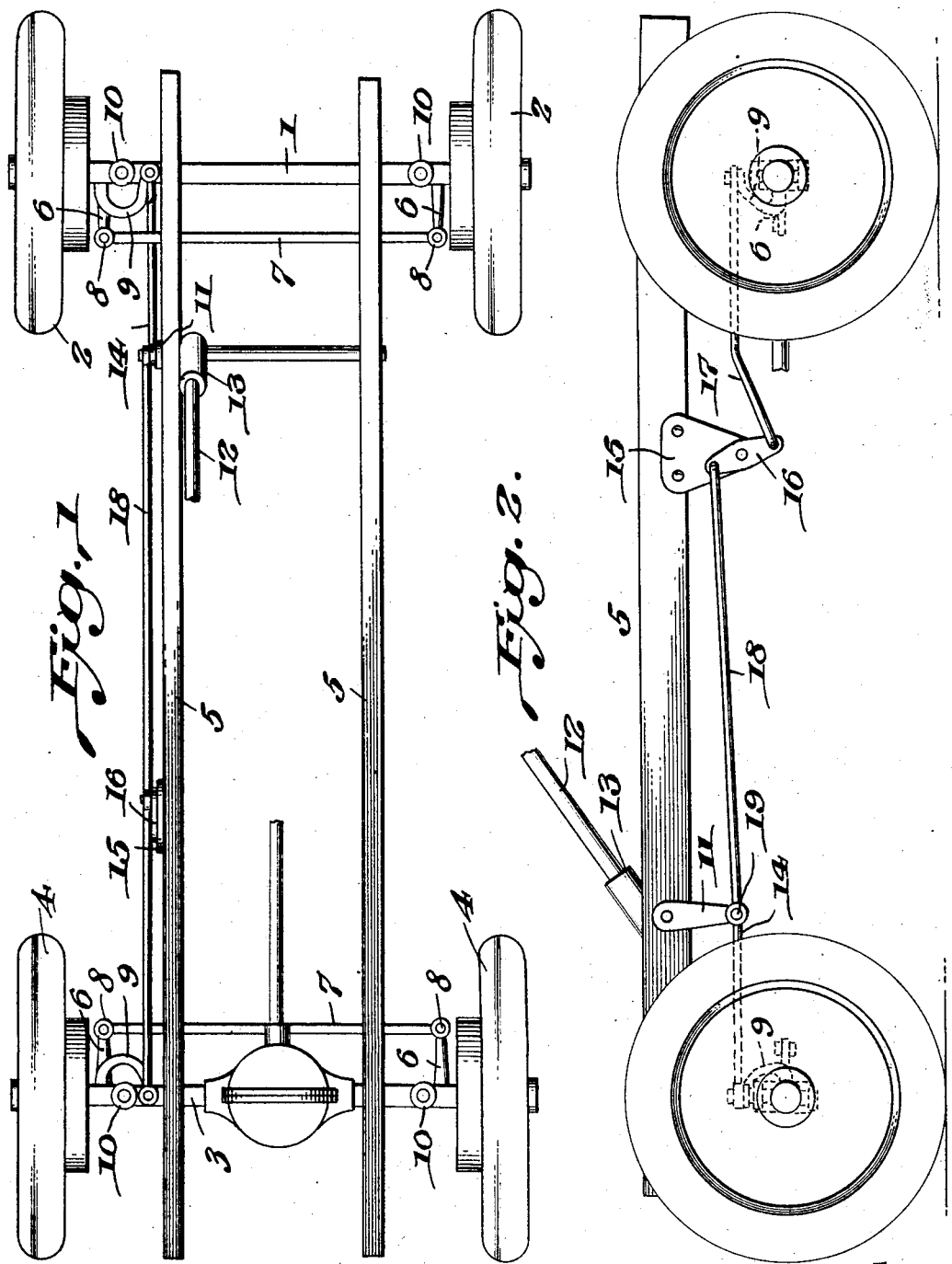
Inventor,
Morris Virgil Reed
By Patented Dec. 20, 1932

1,891,578

UNITED STATES PATENT OFFICE

MORRIS VIRGIL REED, OF EVANSVILLE, INDIANA

FOUR WHEEL STEERING GEAR FOR AUTOMOBILES

Application filed June 21, 1930. Serial No. 462,840.

The object of this invention is to provide a simple, inexpensive and efficient steering gear applied to all four wheels of an automobile, wherein equalization is provided as between the steering means for the front and rear wheels, enabling the rear wheels to "track" the front wheels, thereby to greatly shorten the radius within which the car can be turned.

The invention is disclosed in the accompanying drawing, in which:

Figure 1 is a plan view of the chassis of an automobile provided with my improved steering gear, certain parts being broken away; and Fig. 2 is a side elevation thereof.

The front axle appears at 1, the front steering wheels are shown at 2, the rear axle is represented by 3 and the rear steering wheels appear at 4. The side members of the frame are shown at 5.

The steering arms and knuckles for the front wheels 2 are the same as those for the rear wheels 4, hence a description of one set will suffice. The steering arms are shown at 6, being cross-connected by the tie rod 7 which is pivoted at 8. The steering knuckle appears at 9.

The king bolts are shown at 10.

The main steering arm 11 which is operated by any suitable steering gear from the steering wheel through the medium of the steering shaft 12 contained within the steering column 13, is connected to both the front and rear steering knuckles 9.

A front steering rod 14 connects the steering arm 11 to the front steering knuckle 9.

A hanger 15 which is secured to one of the side frame members 5, has pivoted thereto an equalizing rocker or lever 16. The lower end of the rocker or lever 16 is connected by a link 17 to the rear steering knuckle 9.

The upper end of the rocker or equalizing lever 16, is connected to the steering arm 11 by a link 18 which is pivoted to the same pivot 19 to which the steering rod 14 is pivoted.

The forward and rearward movements of the steering arm 11 are transmitted in an equalizing degree or extent to the two steering knuckles 9 through the connections heretofore described, so that the rear wheels 4 "track" the front wheels 2, providing a four wheel steering gear and enabling the car to be turned in a much shorter radius than is possible with the ordinary steering gear where only the front wheels are turned.

What I claim is:

In a unitary-chassis four-wheel automobile, a permanently equalized steering gear for the four wheels thereof, embodying the combination with a front axle, of front steering wheels pivoted to the front axle, steering arms and a tie rod for the front steering wheels to cause them to shift in unison, a rear axle, rear steering wheels pivoted to said rear axle, steering arms and a tie rod connecting the rear steering wheels to cause them to shift in unison, steering knuckles for the front and rear steering wheels, manually operable steering means, a main steering arm, a single pivot carried by said main steering arm, a steering rod connected to said single pivot and permanently connecting the main steering arm to the steering knuckle for the front steering wheels, an equalizing lever or rocker pivoted on a single pivot intermediate its ends to oscillate in its own plane, a link permanently connecting said rocker on one side of its pivot with the single pivot on the main steering arm aforesaid, and a link connecting the rocker on the other side of its pivot with the steering knuckle for the rear wheels, said main steering arm, equalizing lever, and links permanently equalizing the steering gear for the front and rear wheels without resort to additional means for that purpose, whereby the rear wheels always "track" the front wheels.

In testimony whereof I affix my signature.

MORRIS VIRGIL REED.